United States Patent
Cheney et al.

(10) Patent No.: US 11,079,326 B1
(45) Date of Patent: Aug. 3, 2021

(54) METHOD FOR TESTING CURVED REFLECTIVE SURFACES

(71) Applicant: RAYTHEON COMPANY, Waltham, MA (US)

(72) Inventors: Megan Cheney, Tucson, AZ (US); David J. Markason, Tucson, AZ (US); Christopher Janich, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/892,717

(22) Filed: Jun. 4, 2020

(51) Int. Cl.
  *G01B 9/00* (2006.01)
  *G01N 21/55* (2014.01)

(52) U.S. Cl.
  CPC ..... *G01N 21/55* (2013.01); *G01N 2201/0633* (2013.01); *G01N 2201/0636* (2013.01); *G01N 2201/06113* (2013.01)

(58) Field of Classification Search
  CPC ............... G03F 7/706; G01M 11/0264; G01M 11/0214; G01M 11/0228
  USPC .......................................................... 356/124
  See application file for complete search history.

(56) References Cited

U.S. PATENT DOCUMENTS

| 2004/0105100 A1* | 6/2004 | Shirley | ............. | G01B 11/2527 |
| | | | | 356/603 |
| 2006/0012802 A1* | 1/2006 | Shirley | ............. | G01B 11/2527 |
| | | | | 356/603 |

FOREIGN PATENT DOCUMENTS

CN  102141515 B  7/2012

* cited by examiner

*Primary Examiner* — Md M Rahman
(74) *Attorney, Agent, or Firm* — Lando & Anastasi, LLP (57) ABSTRACT

Methods and systems for calculating a reflectance value of a reflective coating on a curved surface of an optical element include calculating the reflectance value by taking a series of photon count measurements of an extended radiation source over a range of values of emitted radiation reflected from the curved surface into a detector. A combination of the measurements and a known value of accepted or conforming reflectance for the reflective coating is used to calculate the reflectance value of the reflective coating on the curved surface.

20 Claims, 9 Drawing Sheets

METHOD FOR TESTING CURVED REFLECTIVE SURFACES

BACKGROUND

Field

Embodiments of the present disclosure generally relate to determining reflectance from a surface of an optical element.

Discussion of Related Art

During the manufacturing of reflective optical elements, a flat witness sample is created having the same reflective coating as the optics. A witness sample is a test piece of optical material used to measure the performance of a coating applied to the test piece. When a reflective coating is applied to curved optical elements, its reflectance properties are inferred from a flat witness sample having the same coating.

To test a reflective coating applied to curved optics, the same reflective coating is applied to a flat witness sample and the reflectance of the witness sample is measured for one or more wavebands of interest. A spectrometer is used to measure light reflected off the flat witness sample and compare the reflected spectral irradiance to that of calibrated test samples of known reflectance. However, due to differences in technique between applying the coating to a flat surface and applying the coating to a curved surface, defects in the curved surface coating can arise that are not present in the flat surface coating. One current solution is to have a person visually inspect the defects in the curved reflective surface coating of an optic. However, if the optic is used outside of the visual spectrum of the eye, the impact of the defect is unknown.

The inspection process for a reflective surface is currently based on visual scratch-dig standards, which determine the size of defects that will not impact form, fit, or function. If the defect is outside of the governing standard, there is no process to determine how the defect will affect form, fit, or function without extensive rework or analysis. During the process of manufacturing curved optical elements, such as curved mirrors, a significant amount of manufacturing cost is expended before final plating or coating is carried out on a surface of the optical element. Defects in the reflective coating may cause the optical elements to be discarded or returned for expensive and time-consuming rework.

SUMMARY OF INVENTION

Aspects and embodiments are directed to a method for calculating a reflectance value, the method comprising the steps of emitting, by an extended radiation source, first radiation at a first intensity along a first optical axis, reflecting, along a second optical axis separated from the first optical axis by a predetermined angle, the first radiation from a region of a curved surface of an optical element having a reflective coating, receiving, by a detector, the reflected first radiation, determining a first count from the received first radiation, emitting, by the radiation source, second radiation at a second intensity along the first optical axis, reflecting, along the second optical axis, the second radiation from the region of the curved surface, receiving, by the detector, the reflected second radiation, determining a second count from the received second radiation, and calculating the reflectance value based on a difference between the first count and the second count and a difference between a first irradiance value and a second irradiance value.

In one example, calculating the reflectance value further comprises calculating a quality metric of the region, a numerator of the quality metric calculated as the first count subtracted from the second count, a denominator of the quality metric calculated as the first irradiance value subtracted from the second irradiance value, the quality metric calculated as the numerator divided by the denominator, calculating a ratio of the quality metric of the region to a quality metric of a conforming region, and obtaining the reflectance value by multiplying the ratio by an accepted conforming reflectance value.

In another example, the accepted conforming reflectance value is a known accepted standard of reflectance of the reflective coating.

In one example, the method further comprises calculating the quality metric of the conforming region based on the detector receiving the reflected first radiation and the reflected second radiation from a reflective surface of a flat optical element including the reflective coating.

In another example, the method further comprises calculating the quality metric of the conforming region based on the detector receiving the reflected first radiation and the reflected second radiation from a second region of the curved surface of the optical element having the reflective coating.

In one example, the method further comprises emitting along the second optical axis, by the extended radiation source, third radiation at the first intensity, receiving, by the detector, the third radiation, determining the first irradiance value from the received third radiation, emitting along the second optical axis, by the radiation source, fourth radiation at the second intensity, receiving, by the detector, the fourth radiation, and determining the second irradiance value from the received fourth radiation.

In another example, the first count is a count of photons reflected from the region as the received first radiation, the second count is a count of photons reflected from the region as the received second radiation, and the first and second irradiance values are obtained without reflection from the optical element.

In one example, calculating the reflectance value further comprises calculating the reflectance value based on a difference between a third irradiance value and a fourth irradiance value and a difference between a third count and a fourth count, the third irradiance value and the third count based on a third intensity, and the fourth irradiance value and the fourth count based on a fourth intensity.

In another example, the fourth intensity is higher than the third intensity, the third intensity is higher than the second intensity, and the second intensity is higher than the first intensity.

In one example, each count is a photon count of a number of photons received by the detector and each of the first intensity, the second intensity, the third intensity, and the fourth intensity is a temperature included in a range of 18° C. to 32° C.

In another example, the method further comprises calculating a linear least square fit to the first count the second count, the first irradiance value, and the second irradiance value.

In one example, the extended radiation source is a flat field extended source blackbody.

In another example, the first radiation and the second radiation are included in a wavelength range of one of (a)

between 10 nm and 400 nm; (b) between 400 nm and 700 nm; (c) between 700 nm and 1 mm; and (d) between 1 mm and 10 mm.

Aspects and embodiments are directed to a system for calculating a reflectance value comprising a radiation source configured to emit first radiation at a first intensity along a first optical axis and emit second radiation at a second intensity along the first optical axis, an optical element including a curved surface having a reflective coating, a region of the curved surface configured to reflect the first radiation along a second optical axis separated from the first optical axis by a predetermined angle, and reflect the second radiation along the second optical axis, a detector configured to receive the reflected first radiation and receive the reflected second radiation, and a controller configured to determine a first count from the received first radiation, determine a second count from the received second radiation, and calculate the reflectance value based on a difference between the first count and the second count and a difference between a first irradiance value and a second irradiance value.

In one example, the system further comprises a flat optical element including the reflective coating, and the detector is further configured to receive the reflected first radiation and the reflected second radiation from a reflective surface of the flat optical element.

In another example, the extended radiation source is further configured to emit third radiation at the first intensity and fourth radiation at the second intensity along the second optical axis, the detector is further configured to receive the third radiation and the fourth radiation, and the controller is configured to determine the first irradiance value from the received third radiation and determine the second irradiance value from the received second radiation.

In one example, the first count is a count of photons reflected from the region as the received first radiation, the second count is a count of photons reflected from the region as the received second radiation, and the first and second irradiance values are obtained without reflection from the optical element.

In another example, the controller is further configured to calculate the reflectance value based on a difference between a third irradiance value and a fourth irradiance value and a difference between a third count and a fourth count, the third irradiance value and the third count based on a third intensity, and the fourth irradiance value and the count based on a fourth intensity.

In one example, the fourth intensity is higher than the third intensity, the third intensity is higher than the second intensity, and the second intensity is higher than the first intensity.

In another example, each count is a photon count of a number of photons received by the detector and each of the first intensity, the second intensity, the third intensity, and the fourth intensity is a temperature included in a range of 18° C. to 32° C.

In one example, the controller is further configured to calculate a linear least square fit to the first count, the second count, the first irradiance value, and the second irradiance value.

In another example, the extended radiation source is a flat field extended source blackbody.

In one example, a camera includes the detector and a lens coupled to the camera, the lens configured to receive the reflected first radiation, transmit the reflected first radiation to the detector, receive the reflected second radiation, and transmit the reflected second radiation to the detector.

In another example, the first radiation and the second radiation are included in a wavelength range of one of (a) between 10 nm and 400 nm; (b) between 400 nm and 700 nm; (c) between 700 nm and 1 mm; and (d) between 1 mm and 10 mm.

In one example, the detector is coupled to the controller and the controller is included in a computer, the computer configured to output a value of the reflected first radiation, a value of the reflected second radiation, the first irradiance value, the second irradiance value, and the reflectance value to a display.

In another example, the optical element is a warmshield. In one example, the warmshield a spherical warmshield. In another example, the optical element is a mirror.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "an example," "another embodiment," "another example," "some embodiments," "some examples," "other embodiments," "an alternate embodiment," "various embodiments," "one embodiment," "at least one embodiment," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

It is to be appreciated that embodiments of the methods, systems, and computer readable mediums discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. As used herein, the term "plurality" refers to two or more items or components. The terms "comprising," "including," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. References to "or" may be construed as inclusive so that any terms described using "or" may indicate any of a single, more than one, and all of the described terms.

Aspects and embodiments described herein are generally directed to methods and systems for calculating a reflectance value of a reflective coating on a curved surface of an optical element.

Reflectance testing of curved optical elements having reflective coatings is typically completed on flat witness coupons or samples at the supplier, and not on the curved optical elements directly. In some instances, defects (e.g., haziness in the coating) present on the curved surface are not present on the flat witness samples. As such, reflectance testing of only a flat witness sample may not be representative of the reflectance properties of the curved surface exhibiting defects in the reflective coating.

What is needed is an ability to directly test the reflectance of curved reflective surfaces in waveband(s) of interest.

Figure 1:
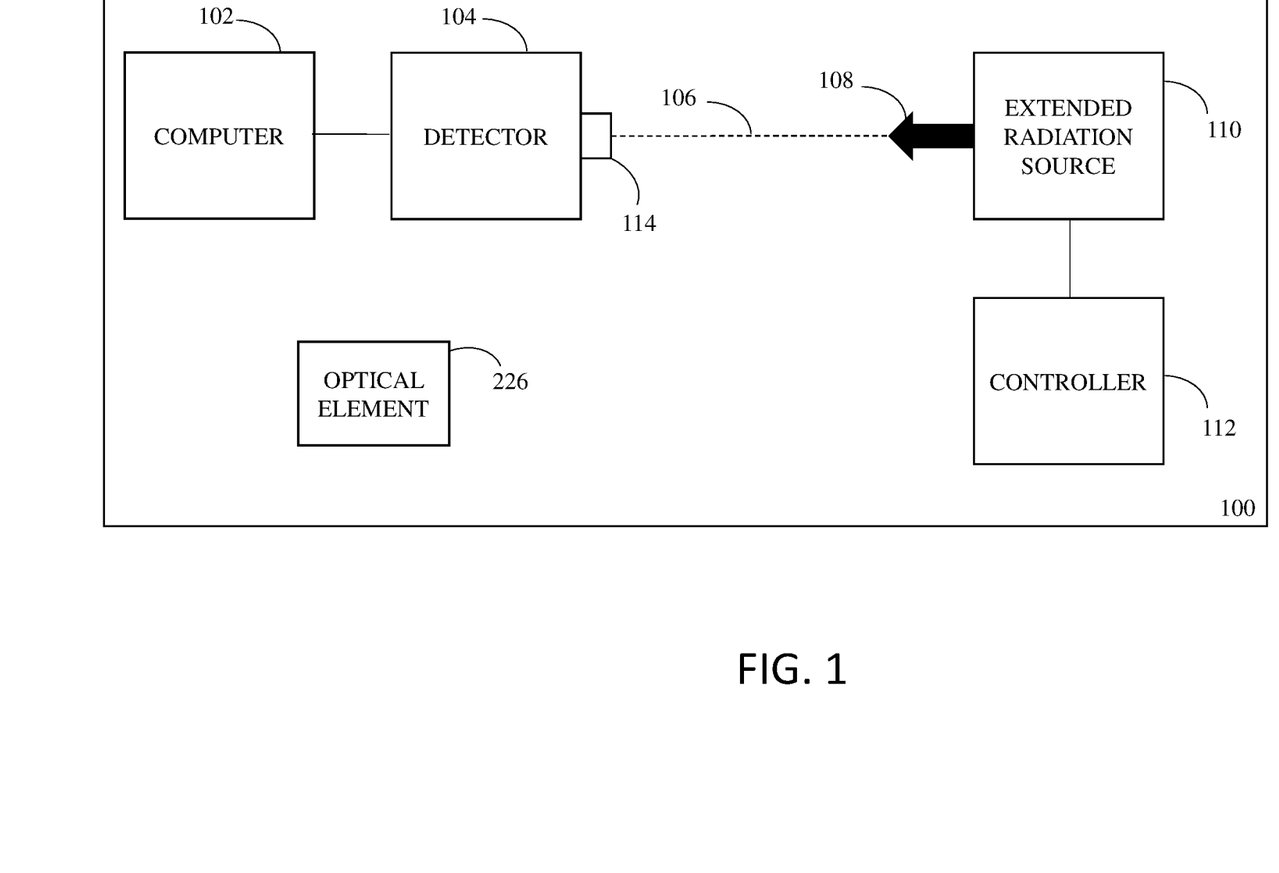
FIG. 1 is a block diagram of a reflectance measuring system configured for calibration and/or absolute reflectance measurement, according to aspects described herein.

FIG. 1 illustrates a system 100 including a computer 102, a detector 104, a lens system 114, an extended radiation source 110, a controller 112, and an optical element 226. The optical element 226 includes elements having flat reflective surfaces and curved reflective surfaces.

The controller 112 is coupled to the extended radiation source 110. As used herein, "coupling" or "coupled" includes both electrical coupling (i.e., a wired connection for transmitting and/or receiving analog and/or digital signals) and electromagnetic coupling (i.e., a wireless connection). As illustrated in FIG. 1, the computer 102 is coupled to the detector 104 and the controller 112 is coupled to the extended radiation source 110. In some embodiments, the controller 112 is coupled to one or more of the computer 102 and the detector 104.

The controller 112 is configured to control the extended radiation source 110 by selecting an intensity of radiation to be emitted and sending a signal to the radiation source 110 to emit radiation at the selected intensity. In an example, the controller 112 includes a dial, a display, and one or more buttons. A user manipulates the dial and one or more buttons to select a specific intensity. After the intensity is selected, the radiation source 110 emits radiation 108 at the selected intensity along an optical axis 106, which is configured to optically align lens system 114 with the radiation source 110. The radiation source 110 is configured to emit the radiation 108 directly towards the lens system 114 along the optical axis 106.

The detector 104 is selected based on the waveband(s) of interest to be imaged for radiation reflected off the coating of the curved surface of the optical element 226. In some embodiments of system 100, the detector 104 is a photon-counting infrared camera. Other embodiments of system 100 include a forward-looking infrared camera as the detector 104. Some embodiments of system 100 include the detector 104 being a charge-coupled device (CCD) camera. Each embodiment of the detector 104 described herein includes a sensor having a plurality of pixels configured to receive radiation from the extended radiation source 110.

In some embodiments, the extended radiation source 110 is a flat field extended source blackbody configured to emit infrared radiation. To emit infrared radiation, the controller 112 is configured as a blackbody controller coupled to the flat field extended source blackbody. The controller 112 is configured to select a temperature of the radiation 108 output from the flat field extended source blackbody.

According to some embodiments for imaging using infrared radiation, a lens of the lens system 114 is made of one or more of Barium Fluoride, Calcium Fluoride, Cesium Bromide, Cesium Iodide, Germanium, Potassium Bromide, Potassium Chloride, Sapphire, Silicon, Sodium Chloride, Thallium Bromoiodide, Zinc Selenide, and Zinc Sulfide. In other embodiments, the lens is made of one or more of an infrared lens material including AMTIR-1, Arsenic Trisulfide, Cadmium Telluride, Gallium Arsenide, Sapphire, and Chalcogenide glass (e.g., IRG22, IRG23, IRG24). In some embodiments, the lens is made of one or more of a visible wavelength lens material including N-BK7, N-F2, fused silica, K10, N-LAF2, N-LAK12, N-LAS41, N-PKS3, N-SF10, N-SK11, and N-SSK2. Other lens materials known to one of ordinary skill in the art are included in the embodiments described herein.

To detect visible wavelengths, in other embodiments, the extended radiation source 110 is a white sheet of paper that reflects light from a visible wavelength source (e.g., a tungsten lamp). The flux of the visible wavelength source is changed by altering the distance between the source and the paper.

Reflective coatings having low properties are included in embodiments disclosed herein. As an example, an anti-reflection coating applied to a curved surface of an optical element is analyzed to determine its reflectance characteristics. In some embodiments, the anti-reflection coating is one or more of Magnesium Fluoride ($MgF_2$), Silicon Nitride, and Yttrium Fluoride ($Y_2$).

As illustrated in FIG. 1, the radiation 108 is transmitted along optical axis 106 without intersecting any other object before encountering lens system 114. The lens system 114 is configured to receive radiation 108 and focus the received radiation onto a sensor of the detector 104. The sensor comprises a plurality of pixels on a focal plane of the detector 104.

In some embodiments of system 100, the radiation 108 is selected from a wavelength range of one of (a) between 10 nm and 400 nm (i.e., Ultraviolet); (b) between 400 nm and 700 nm (i.e., Visible); (c) between 700 nm and 1 mm (i.e., Infrared); and between 1 mm to 10 mm (millimeter wave). The reflective coating is configured to reflect the selected radiation.

Figure 2A:
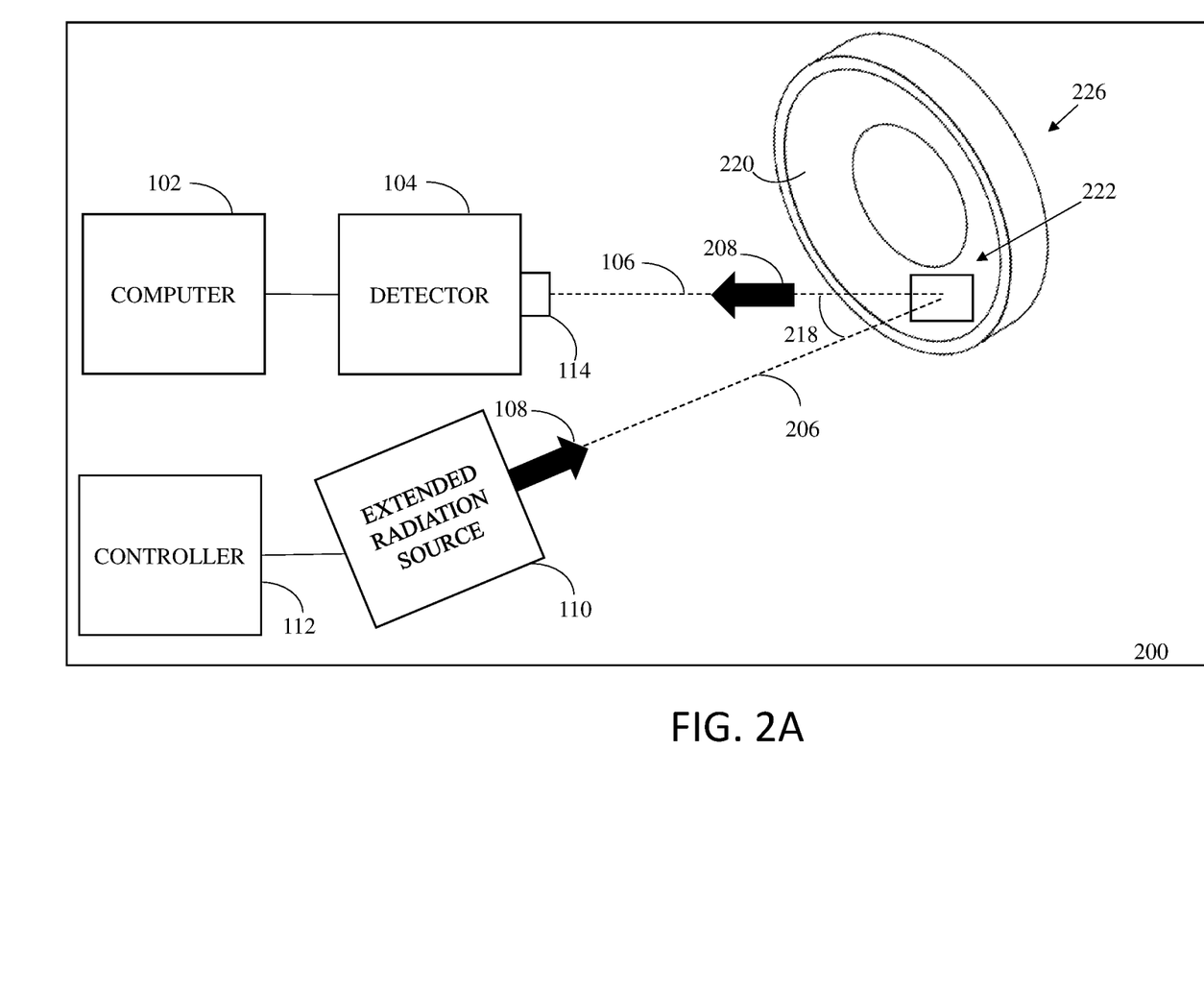
FIG. 2A is a block diagram of a reflectance measuring system configured for absolute and/or relative reflectance measurement, according to aspects described herein.

FIG. 2A illustrates a system 200 including the computer 102, the detector 104, the lens system 114, the extended radiation source 110, the controller 112, and the optical element 226. The optical element 226 includes a curved surface 220 having a reflective coating thereon. The reflective coating is configured to reflect at least a portion of the radiation 108 at the intensity selected by the controller 112. A region 222 of the curved surface 220 contains a region 222 of the reflective coating for inspection. Description of elements in common with FIG. 1 will be omitted for the sake of brevity.

FIG. 2A differs from FIG. 1 in that the location of the controller 112 is moved to a new position such that the radiation 108 is transmitted along a first optical axis 206, which is separated from a second optical axis 106 by a fixed angle 218. The angle 218 is designed such that the extended radiation source 110 is fully visible within the field of view of the detector 104 from the reflection of the extended radiation source 110 on the curved surface 220 within the region 222. The angle 218 between the first optical axis 206 and the second optical axis 106 causes the radiation 108 to reflect from the region 222 of the optical element 226 towards the lens system 114 along the second optical axis 106. In some embodiments, the angle 218 is within the range of 1° to 89°. In some embodiments, the optical element 226 is secured in a fixture to prevent its position from changing throughout the measurements. The configuration of system 200 is utilized for absolute and/or relative reflectance measurements.

Figure 2B:
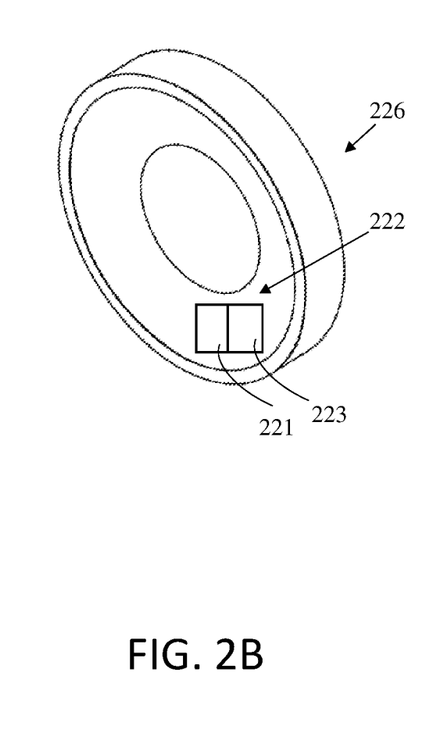
FIG. 2B is an optical element, according to aspects described herein.

FIG. 2B is an illustration of the optical element 226, where the region 222 includes a region 221 of the reflective coating for inspection and a region 223 including a conforming application of the reflective coating on the curved surface 220. The regions 221, 223 in FIG. 2B are utilized for relative reflectance measurements.

Figure 2C:
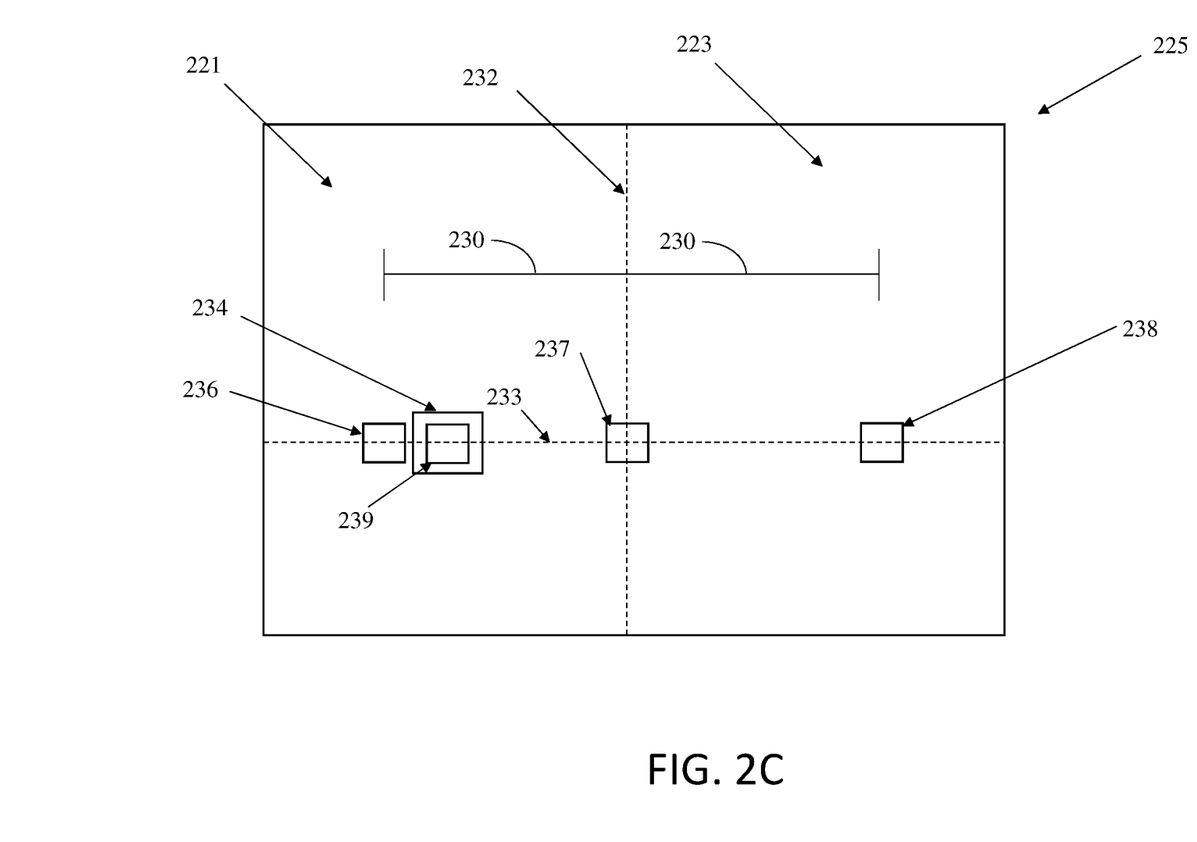
FIG. 2C is an image with test regions generated by a reflectance measuring system, according to aspects described herein.

FIG. 2C is an illustration of an image 225 of the regions 221, 223 produced by the detector 104 for relative reflectance measurements. The image 225 includes a vertical axis 232 that is aligned with a center pixel of the detector 104, a horizontal axis 233 that is aligned with the center pixel of the detector 104 (i.e., both axes intersect at the center pixel), an image 234 of the extended radiation source 110 that is reflected off the curved surface 220 at the region 222, and test regions 236, 237, 238, 239. As illustrated, each test region 236 and 238 is the same distance 230 (e.g., in pixels or sub-pixels) from the vertical axis 232 and the center test region 237. In some embodiments, the axes 232, 233 are in optical alignment with the optical axis 106. Embodiments of system 200 include any one or more of the test regions 236, 237, 238, 239 being positioned at any point in the image 22. According to some embodiments, the intersection of the center test region 237 corresponds to a region of the surface 220 suspected of having a defect in the reflective coating and one or more of the regions 236, 238, 239 correspond to a region of the surface 220 free of defects in the reflective coating. Additional embodiments include the test region 239 overlapping the image 234 of the extended radiation source 110.

Figure 2D:
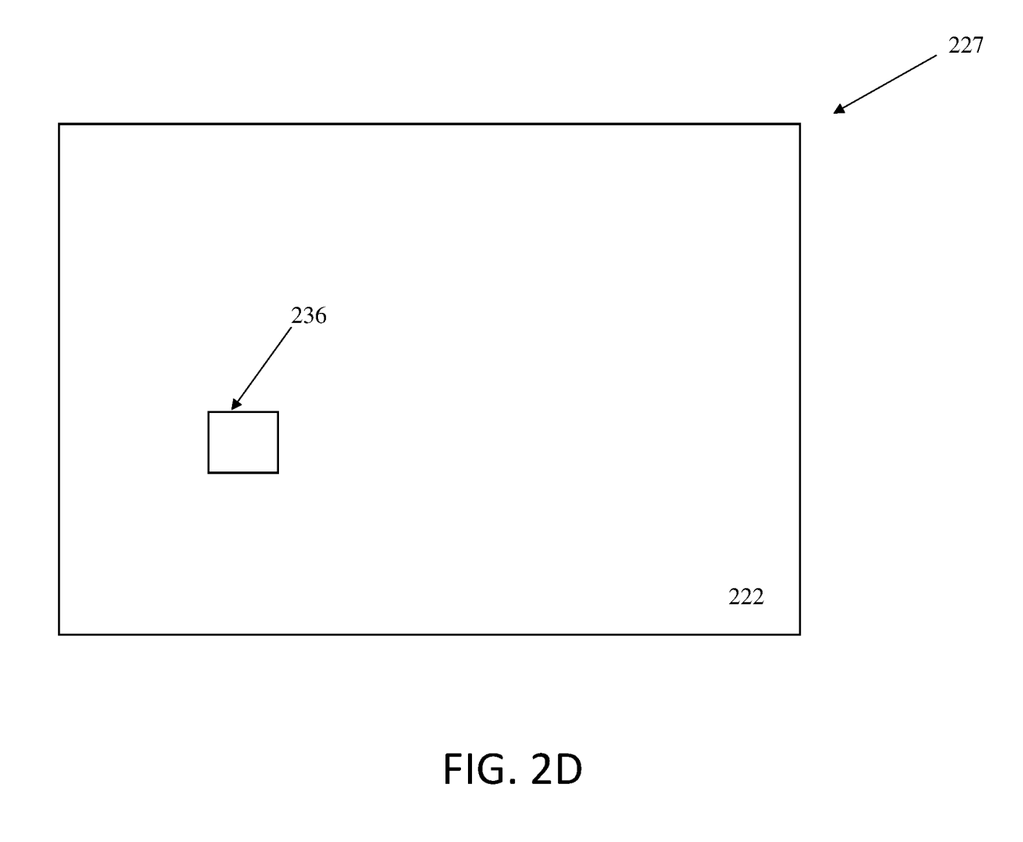
FIG. 2D is an image with a test region generated by a reflectance measuring system, according to aspects described herein.

For absolute reflectance measurements, an image 227, illustrated in FIG. 2D, is obtained of the region 222 in a manner similar to that in obtaining the image 225. In the image 227, a test region may be obtained for the region 222 anywhere in the image 227, including within the image 236 of the extended radiation source.

In each embodiment of system 200, a plurality of pixels of the detector 104 is configured to receive the radiation 208 from the extended radiation source 110 reflected from the region 222.

Figure 3A:
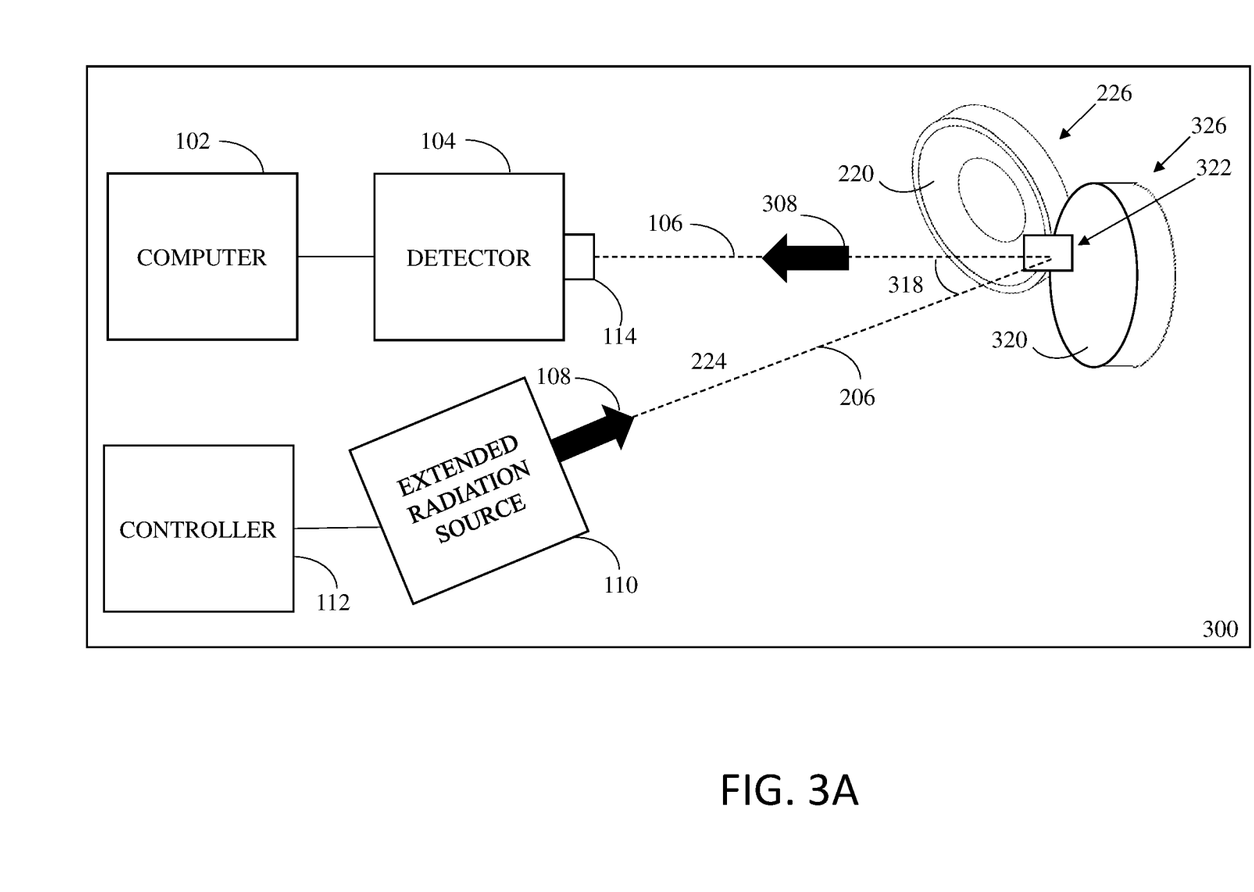
FIG. 3A is a block diagram of a reflectance measuring system configured for relative reflectance measurement, according to aspects described herein.

FIG. 3A illustrates a system 300 including the computer 102, the detector 104, the lens system 112, the extended radiation source 110, the controller 112, the optical element 226 having the curved reflective surface 220, and an optical element 326 having a reflective surface 320. In some embodiments, the angle 318 is different than the angle 218. (e.g., a difference in a fixed number of degrees and/or or fractions of a degree). In some embodiments, the optical element 326 is a flat witness coupon having the same reflective coating as the optical element 226. The computer 102 in FIG. 3A is coupled to the detector 104 and the controller 112 is coupled to the extended radiation source 110.

FIG. 3A differs from FIG. 2 in that the detector 104 is configured to receive radiation 308 through the lens system 114, the radiation 308 reflected from one region of the reflective curved surface 220 and one region of the reflective surface 320, each region included in the region 322. The region 322 corresponds to the field of view of the detector 104. In some embodiments, the region 322 is the image produced by the detector 104. The angle 318 between the first optical axis 206 and the second optical axis 106 causes the radiation 108 to reflect from the region 222 of the optical element 226 towards the lens system 114 along the second optical axis 106. In some embodiments, the angle 318 is within the range of 1° to 89°. In some embodiments, the optical elements 226, 326 are secured in a fixture to prevent their positions from changing throughout the measurements.

Figure 3B:
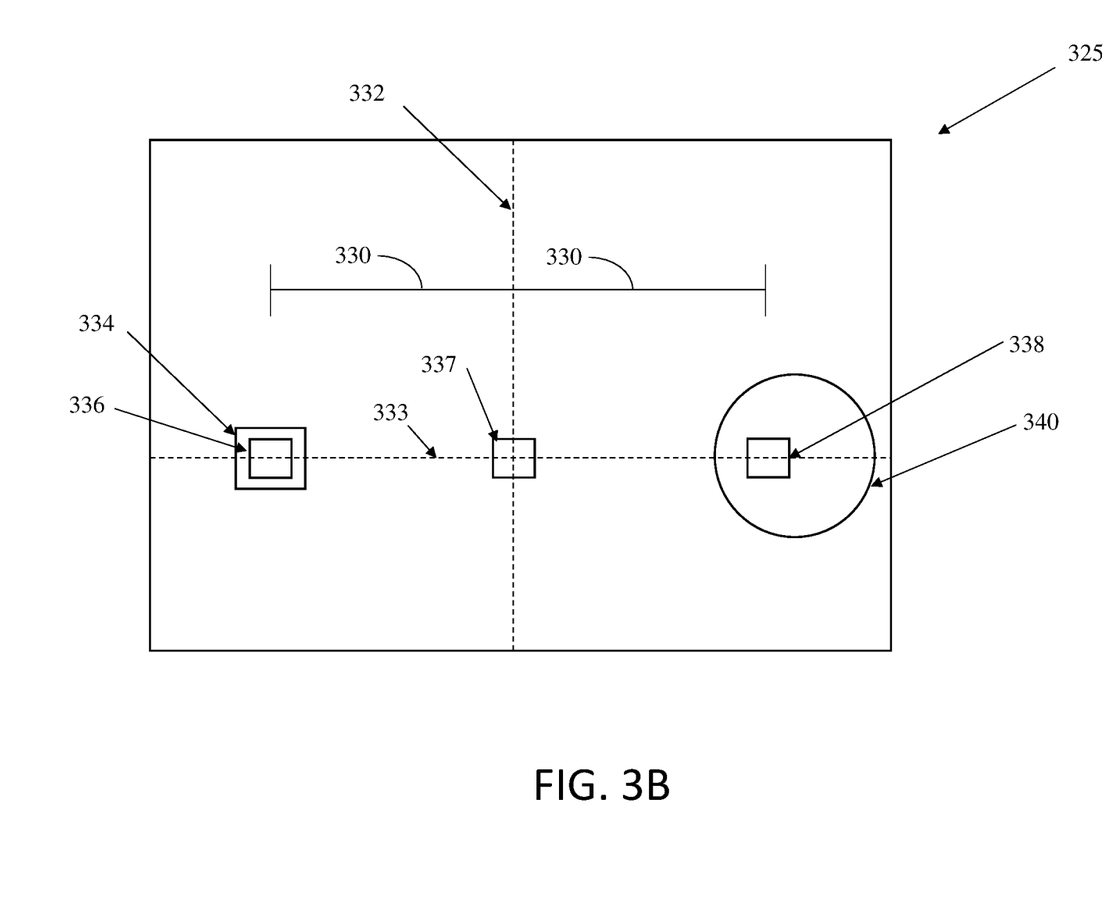
FIG. 3B is an image with test regions generated by a reflectance measuring system according to aspects described herein.

FIG. 3B is an illustration of an image 325 of the region 322 produced by the detector 104. The image 325 includes a vertical axis 332 that is aligned with a center pixel of the detector 104, a horizontal axis 333 that is aligned with the center pixel of the detector 104 (i.e., both axes intersect at the center pixel), an image 334 of the extended radiation source 110 that is reflected off the curved surface 220, an image 340 of the extended radiation source 110 that is reflected off the surface 320. The image 325 further includes a test region 336 for the curved surface 220 that overlaps with the image 334 of the extended radiation source, and a test region 338 for the surface 320. The test region 338 overlaps with the image 334 of the extended radiation source 110 reflected off the surface 320. As illustrated in FIG. 3B, each test region 336, 338 is the same distance 330 from the central axis 332. In some embodiments, the axes 332, 333 are in optical alignment with the optical axis 106. Embodiments of system 300 include any one or more of the test regions 336, 337, 338 being positioned at any point in the image 322 corresponding to the curved surface 220 and the surface 320.

It is understood that embodiments disclosed herein are not limited to rectangular test regions of a particular size, and that test regions of any shape and size (e.g., one or more pixels) may be utilized within the knowledge of one of ordinary skill in the art. Furthermore, it is understood that the images 234, 334, 340 of the extended radiation source reflected off an optical element may be represented by any enclosed shape.

Figure 4:
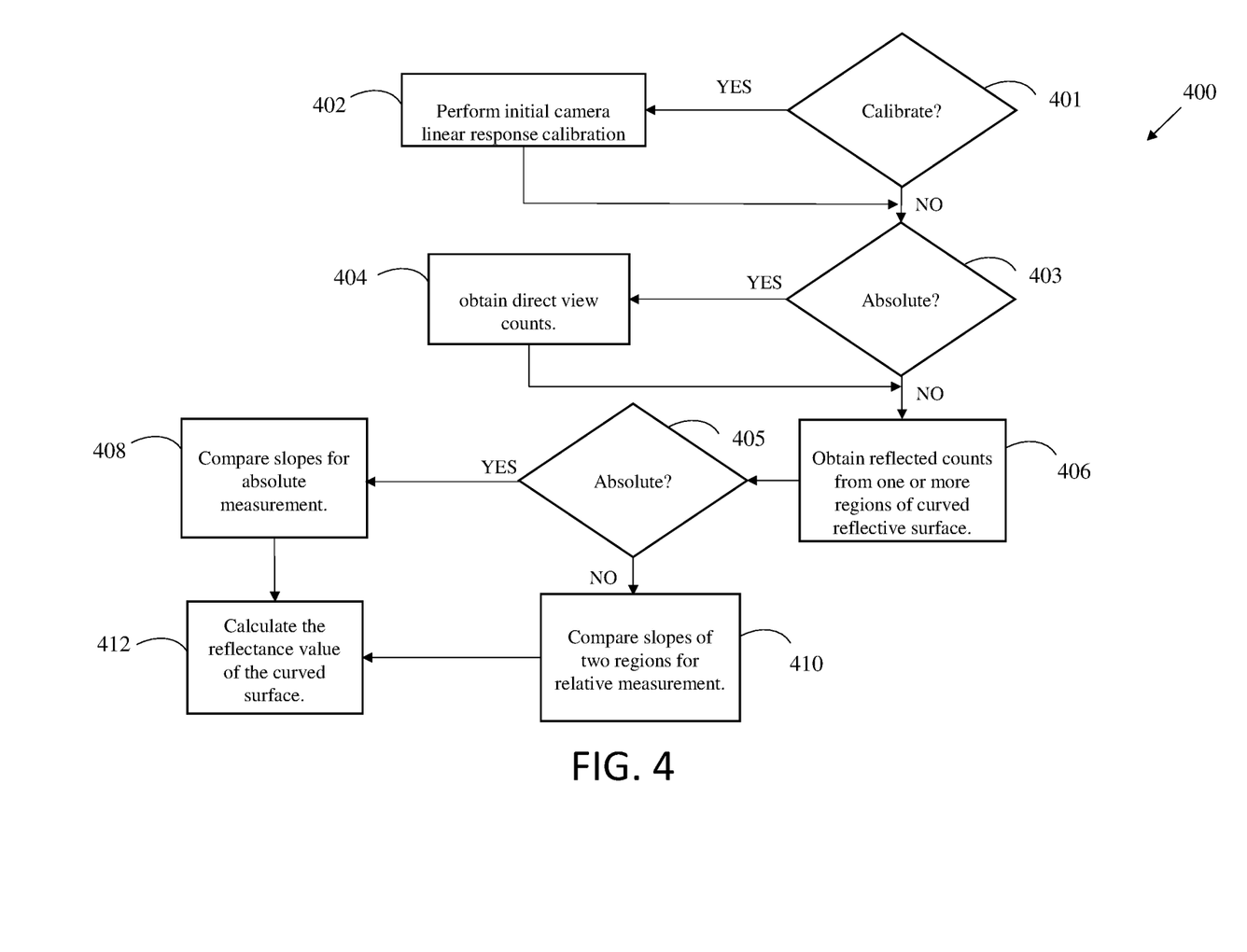
FIG. 4 is a flow chart illustrating a method of calculating a reflectance value of a curved reflective surface, according to aspects described herein.

FIG. 4 illustrates a method 400 including the conditions 401, 403, and 405, and the acts 402, 404, 406, 408, 410, and 412.

Before acquiring either an absolute or relative reflectance measurement, the detector 104 needs to be calibrated by the computer 102 to achieve a uniform or linear response across the plurality of pixels of its sensor. In some embodiments, the detector 104 calibrates itself without the computer 102. If the detector 104 needs to be calibrated, the method 400 proceeds to act 402 (i.e., condition 401 is YES). If the detector 104 is already calibrated, the method 400 proceeds to the condition 403 (i.e., condition 401 is NO).

In some embodiments, for measuring infrared radiation, act 402 includes a nonuniformity correction (NUC) algorithm to achieve uniformity in pixel response across the sensor of the sensor in the detector 104 configured to detect infrared radiation. In one example, single-point NUC is performed. In another example, two-point NUC is performed. For two-point NUC, two blackbody temperature values are set as a first intensity and a second intensity of the extended radiation source 110, as illustrated in FIG. 1. In an example, a first set temperature value is 18° C. and a second set temperature value is 32° C. In another example, a blackbody irradiance value is recorded for each temperature of 18° C. to 32° C. in 1° increments.

For other wavelengths of interest, for example UV or visible wavelengths, a different series of intensity values is utilized to calibrate the detector 104, if calibration is needed. The number of intensity values can vary, with the more values being acquired, the more noise and error being removed from the resulting calibrated linear response of the detector 104.

If an absolute reflectance measurement is required (i.e., condition 403 is YES), then act 404 is performed using the configuration of FIG. 1 to obtain direct view counts. If a relative reflectance measurement is required (i.e., condition 403 is NO), then act 406 is performed using the configuration of FIG. 2A or FIG. 3A to obtain reflection counts.

In act 404, for each intensity value of a series of intensity values, the controller 112 instructs the extended radiation source 110 to emit the radiation 108 corresponding to a selected intensity value along the optical axis 106, as illustrated in FIG. 1. As the radiation 108 enters the lens system 114, it is focused onto one or more of the plurality of pixels of the sensor in the detector 104. Each pixel generates a value in Watts from an analog signal produced by the pixel, which is then converted to a current value and digitized, which is then utilized by the detector 104 to measure a value of counts of photons striking the pixel.

In some embodiments, the irradiance values are calculated according to equation (1):

$$I_\lambda(T) = \int_{\lambda_1}^{\lambda_2} \frac{8\pi hc^2}{\lambda^5} \frac{1}{e^{\frac{hc}{\lambda kT}} - 1} d\lambda,$$

where T is a temperature set by the controller 112, λ is a wavelength, c is the speed of light, k is the Boltzmann constant, h is the Planck constant, $\lambda_1$ is a lower bound of the waveband that detector 104 detects in, and $\lambda_2$ is an upper bound of the waveband that detector 104 detects in. Together, $\lambda_1$ and $\lambda_2$ act as a bandpass filter of the detector 104. The irradiance I is measured in Watts per square-centimeter $$\left(\frac{W}{cm^2}\right).$$

the range of temperature values may be modified to any suitable range within the knowledge of one of ordinary skill in the art. The range of temperatures is selected to be representative of a range of temperatures expected to be reflected by the coating under inspection.

For embodiments utilizing a laser in place of the extended radiation source 110, a suitable equation is substituted for equation (1) incorporating the wavelength of the emitted laser beam. For additional wavebands of interest, equation (1) may be modified or substituted by a suitable equation to calculate irradiance for an extended radiation source of the waveband(s) of interest.

In act 406, the extended source 110 is re-positioned. In some embodiments, the source 110 is positioned as illustrated in FIG. 2A (for absolute and/or relative measurement) or FIG. 3A (for relative measurement). Before the optical element 226 is analyzed for defects, reflection count values are acquired. In some embodiments, the reflection counts are acquired for one or more of the same intensity values used to determine the irradiance values in step 404. For each intensity value, the controller 112 sets the intensity of the radiation 108 and instructs the extended radiation source 110 to transmit the radiation 108 along the first optical axis 206.

According to certain embodiments, for calculating an absolute reflectance measurement, the configuration as illustrated in FIG. 2A is utilized to produce one or more images of the curved surface 220 to calculate reflection counts. As an example, the one or more images correspond to region 222 as a whole (i.e., without distinguishing between subregions 221 and 223. In some embodiments, each pixel in the one or more images has a corresponding reflection count value produced by at least a portion of the radiation 108 reflecting of region 222 at the angle 218.

In some embodiments, for calculating a relative reflective measurement, a configuration as illustrated in FIG. 2A or 3A is utilized to produce one or more images 225, 235, as illustrated in FIGS. 2C and 3B. According to certain embodiments, each pixel in the one or more images 225 has a corresponding reflection count value produced by at least a portion of the radiation 108 reflecting off regions 221, 223 (i.e., the imaged area of the surface 220) at the predetermined angle 218. According to certain embodiments, each pixel in the one or more images 325 has a corresponding reflection count value produced by at least a portion of the radiation 108 reflecting off region 322 (i.e., the imaged area of the surface 220 and the surface 320) at the angle 318.

Each intensity value set by the controller 112 produces a determined photon count for a given irradiance value corresponding to the intensity value. The photon count is stored as a reflection count value. Some embodiments determine and store one or more reflection count values for region 222 or region 322 as an average of all photon counts of each pixel corresponding to the respective region. In some embodiments, the irradiance values are determined utilizing equation (1) or a suitable substitute for a waveband of interest.

Condition 405 determines if an absolute measurement was indicated in condition 403. If so, condition 405 is YES. If not, condition 405 is NO and the method proceeds to act 410. In acts 408 and 410, one or more values of slope (i.e., counts per irradiance) are calculated utilizing equation (2):

$$\text{slope} = \frac{C_b - C_a}{I_b - I_a},$$

where $C_a$ is the count value for a first intensity value a, $C_b$ is the count value for a second intensity value b higher or larger than the first intensity value a, $I_a$ is the irradiance value for the first intensity value, $I_b$ is the irradiance value for the second intensity value, and the slope is the slope of the line between the data point $(I_b,C_b)$ and $(I_a,C_a)$. The value of slope is a quality metric for the reflective coating under inspection. The more measurements taken at different radiation source intensities that are used to calculate the slope, the less the slope is susceptible to measurement error or noise in systems 200, 300. Each calculation of slope of $C_a$ and $C_b$ is for direct view counts and reflected counts in the case of act 406 and reflected counts in the case of act 410.

To calculate the slope of a test region of the optical element 226, for example one of regions 236, 237, 238, 239, 336, 337, and 338, a curve or line is fit to the irradiance and count data, including direct and reflection counts, for the intensities set by the controller 112. Some embodiments include performing a regression analysis to calculate a best-fit line. In an example, a linear least square fit is applied to the irradiance value and photon count obtained for each different intensity value. In some embodiments, the regression analysis utilizes one of linear regression, logistic regression, and polynomial regression. Other best fit techniques are contemplated. The slope is the slope of the line that linearly relates photon count to irradiance for a range of intensities. Each value of slope has units of photons or counts per Watt per centimeter squared (i.e., counts/

$$\left(\frac{W}{cm^2}\right)).$$

In act 408, the slope of a test region of the curved surface 220 of the optical element 226 is compared to the slope of the direct view of the extended radiation source 110 according to the configuration illustrated in FIG. 1. The slope of the test region is compared to the slope of the direct view according to equation (3):

$$U = \frac{\text{slope of test region}}{\text{slope of direct view}},$$

The test region in equation (3) may be any region on surface 220 of the optical element 226. As an example, the test region in act 408 is region 222.

In act 410, the slope of a test region of the curved surface 220 of the optical element 226 is compared to the slope of a conforming region according to the configuration illustrated in FIGS. 2A and 3A. In some embodiments, the test region is region 236 and the conforming region is region 238. The slope of the test region is compared to the slope of a conforming region according to equation (4):

$$V = \frac{\text{slope of test region}}{\text{slope of conforming region}},$$

Per equation (2), for infrared radiation, $C_a$ is the reflection count value for a first temperature value, $C_b$ is the reflection count value for a second temperature value higher or larger than the first temperature value, $I_a$ is the irradiance value for the first temperature value, $I_b$ is the irradiance value for the second temperature value, and the slope is the slope of the line between the data point $(I_b,C_b)$ and $(I_a,C_a)$. In an example of calculating slope for infrared radiation, the first temperature is 20° C. and the second temperature is 21° C. In some embodiments, the slope is re-calculated for one or more, or all of the reflection count values for which there are corresponding irradiance values at the same intensity. In an example, the slope is calculated for more than two temperatures (e.g., increments of 1° C. from 18° C. to 32° C.). In some embodiments, the slope is calculated for each temperature used in act 404 (for infrared radiation) to acquire the irradiance values. Some embodiments calculate the slope for a subset of the temperatures or intensities used in act 402 and/or 404. In the case of imaging infrared radiation, the temperature range is selected to get the peak of the blackbody curve close to the waveband(s) of interest. In some embodiments, the slope of the conforming region (e.g., region 223 or region 338) is obtained from storage in the computer 102 or a remote storage accessed over a network.

In act 412, the reflectance value W of a test region of the reflective coating on the curved surface 220 is calculated according to equation (5):

$$W = S \times Y,$$

where W is the reflectance of the test region, S is either U calculated with equation (3) or V calculated with equation (4), and Y is an accepted (i.e., conforming) reflectance value for the reflective coating on the curved surface 220 and/or the surface 320. In some embodiments, the test region includes a hazy region of the reflective coating on the curved surface 220. In an example, S is calculated to be 0.997 by either equation (3) or equation (4), and given that the conforming region has an accepted reflectance of 98.5% (i.e., Y), the test region must have a reflectance of 98.2%. Thus, despite exhibiting defects in the test region, the defects are not detrimental to the performance of the optical element 226.

In some embodiments, optical element 226 is one of a flat, toroidal, and aspherical optical element having a surface with a reflective coating. Each act of method 400 is performed the same way, except for the angle 218, 318 being altered, if needed, to ensure the reflected radiation 208, 308 is received by the lens system 114 and the entire extended radiation source is visible in the received image 225, 325 of the detector 104.

Each act of each embodiment of method 400 is executable as software instructions that are stored on a non-transitory computer-readable medium and executed by one or more processors of the computer 102.

It is understood that embodiments provided herein include modifications of FIG. 4. As an example, a method of only calculating relative reflectances removes the conditions 403 and 405, and the acts 404 and 408, such that NO in condition 401 leads to act 406 and act 406 leads to act 410.

Figure 5:
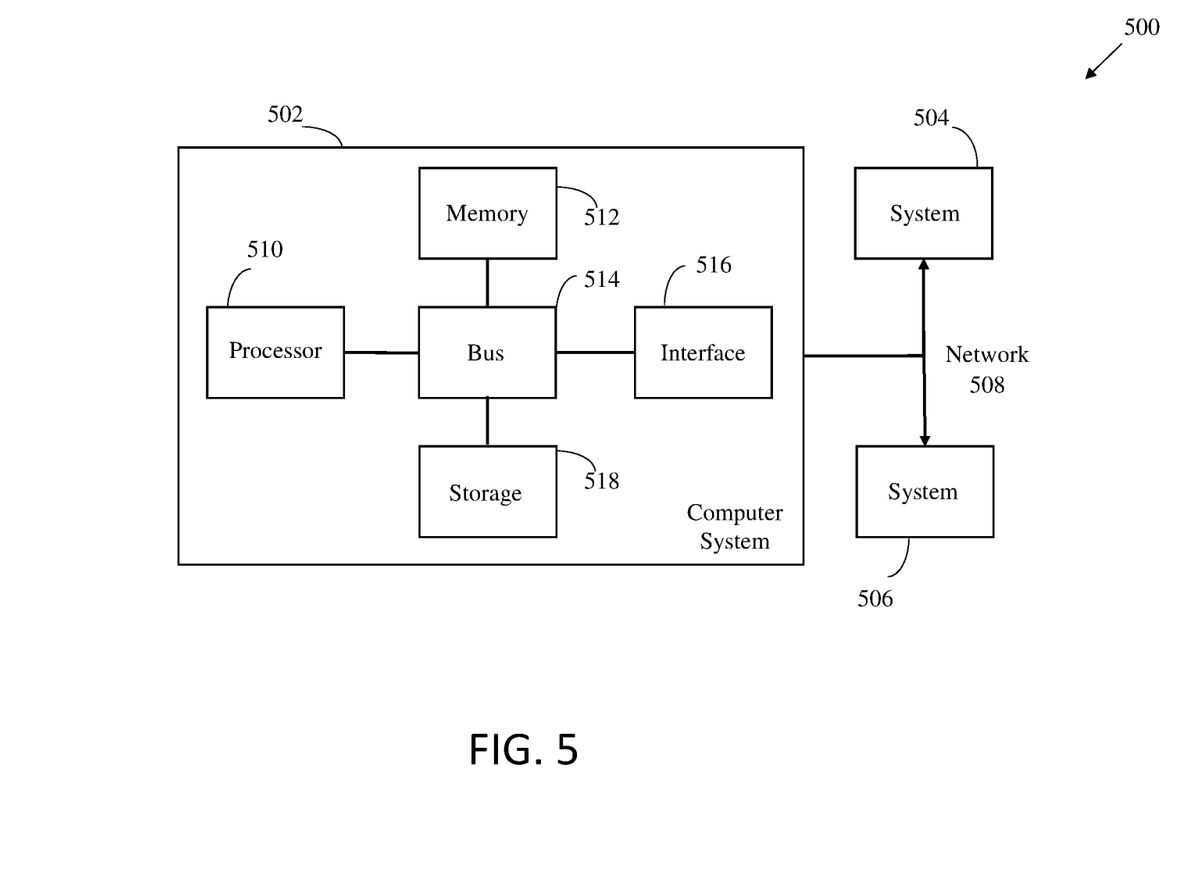
FIG. 5 is a computer system, according to aspects described herein.

FIG. 5 is a block diagram of a distributed computer system 500, in which various aspects and functions discussed above may be practiced. The distributed computer system 500 may include one or more computer systems. For example, as illustrated, the distributed computer system 500 includes three computer systems 502, 504 and 506. The computer 102 may be included in one or more computer systems 502, 504, and 506. As shown, the computer systems 502, 504, and 506 are interconnected by, and may exchange data through, a communication network 508. The network 508 may include any communication network through which computer systems may exchange data. To exchange data via the network 508, the computer systems 502, 504, and 506 and the network 508 may use various methods, protocols and standards including, among others, token ring, Ethernet, Wireless Ethernet, Bluetooth, radio signaling, infra-red signaling, TCP/IP, UDP, HTTP, FTP, SNMP, SMS, MMS, SS7, JSON, XML, REST, SOAP, CORBA HOP, RMI, DCOM and Web Services.

According to some embodiments, the functions and operations discussed for calibrating a detector and/or determining a reflectance value of a curved surface having a reflective coating are performed on computer systems 502, 504, and 506 individually and/or in combination. For example, the computer systems 502, 504, and 506 support, for example, participation in a collaborative network. In one alternative, a single computer system (e.g., 502) can obtain and process images of an optical element with a curved reflective surface. The computer systems 502, 504 and 506 may include personal computing devices such as cellular telephones, smart phones, tablets, "fablets," etc., and may also include desktop computers, laptop computers, etc.

Various aspects and functions in accord with embodiments discussed herein may be implemented as specialized hardware or software executing in one or more computer systems including the computer system 502 shown in FIG. 5. In one embodiment, computer system 502 is a personal computing device specially configured to execute the processes and/or operations discussed above. As depicted, the computer system 502 includes at least one processor 510 (e.g., a single core or a multi-core processor), a memory 512, a bus 514, input/output interfaces (e.g., 516) and storage 418. The processor 510, which may include one or more microprocessors or other types of controllers, can perform a series of instructions that manipulate data. As shown, the processor 510 is connected to other system components, including a memory 512, by an interconnection element (e.g., the bus 514).

The memory 512 and/or storage 418 may be used for storing programs and data during operation of the computer system 502. For example, the memory 512 may be a relatively high performance, volatile, random access memory such as a dynamic random access memory (DRAM) or static memory (SRAM). In addition, the memory 512 may include any device for storing data, such as a disk drive or other non-volatile storage device, such as flash memory, solid state, or phase-change memory (PCM). In further embodiments, the functions and operations discussed with respect to determining a reflectance value of a curved surface can be embodied in an application that is executed on the computer system 502 from the memory 512 and/or the storage 418. For example, the application can be made available through an "app store" for download and/or purchase. Once installed or made available for execution, computer system 502 can be specially configured to execute the processing an image to determine a reflectance value of a curved surface.

Computer system 502 also includes one or more interfaces 516 such as input devices (e.g., camera for capturing images), output devices and combination input/output devices. The interfaces 516 may receive input, provide output, or both. The storage 418 may include a computer-readable and computer-writeable nonvolatile storage medium in which instructions are stored that define a program to be executed by the processor. The storage system 418 also may include information that is recorded, on or in, the medium, and this information may be processed by the application. A medium that can be used with various embodiments may include, for example, optical disk, magnetic disk or flash memory, SSD, NVMe, among others. Further, aspects and embodiments are not to a particular memory system or storage system.

In some embodiments, the computer system 502 may include an operating system that manages at least a portion of the hardware components (e.g., input/output devices, touch screens, cameras, etc.) included in computer system 502. One or more processors or controllers, such as processor 510, may execute an operating system which may be, among others, a Windows-based operating system (e.g., Windows NT, ME, XP, Vista, 7, 8, RT, or 10) available from the Microsoft Corporation, an operating system available from Apple Computer (e.g., MAC OS, including System X), one of many Linux-based operating system distributions (for example, the Enterprise Linux operating system available from Red Hat Inc.), a Solaris operating system available from Sun Microsystems, or a UNIX operating systems available from various sources. Many other operating systems may be used, including operating systems designed for personal computing devices (e.g., iOS, Android, etc.) and embodiments are not limited to any particular operating system.

The processor and operating system together define a computing platform on which applications (e.g., "apps" available from an "app store") may be executed. Additionally, various functions for determining a reflectance value of a curved surface may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed components, or any combination thereof. Various embodiments may be implemented in part as MATLAB functions, scripts, and/or batch jobs. Thus, the invention is not limited to a specific programming language and any suitable programming language could also be used.

Although the computer system 502 is shown by way of example as one type of computer system upon which various functions for determining a reflectance value of a curved surface may be practiced, aspects and embodiments are not limited to being implemented on the computer system, shown in FIG. 5. Various aspects and functions may be practiced on one or more computers or similar devices having different architectures or components than that shown in FIG. 5.

Some embodiments include an optical element 226 having a reflective surface that is one of a warmshield, a mirror, a toroidal reflector, and aspheric lens. A warmshield is an optical element that suppresses stray radiation while achieving F-number matching.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention Accordingly, the foregoing description and drawings are by way of example only.

What is claimed is:

1. A method for calculating a reflectance value, the method comprising the steps of:
   emitting, by an extended radiation source, first radiation at a first intensity along a first optical axis;

reflecting, along a second optical axis separated from the first optical axis by a predetermined angle, the first radiation from a region of a curved surface of an optical element having a reflective coating;
receiving, by a detector, the reflected first radiation;
determining a first count from the received first radiation;
emitting, by the radiation source, second radiation at a second intensity along the first optical axis;
reflecting, along the second optical axis, the second radiation from the region of the curved surface;
receiving, by the detector, the reflected second radiation;
determining a second count from the received second radiation; and
calculating the reflectance value based on a difference between the first count and the second count and a difference between a first irradiance value and a second irradiance value.

2. The method of claim 1, wherein calculating the reflectance value further comprises:
calculating a quality metric of the region, a numerator of the quality metric calculated as the first count subtracted from the second count, a denominator of the quality metric calculated as the first irradiance value subtracted from the second irradiance value, the quality metric calculated as the numerator divided by the denominator;
calculating a ratio of the quality metric of the region to a quality metric of a conforming region; and
obtaining the reflectance value by multiplying the ratio by an accepted conforming reflectance value.

3. The method of claim 2, wherein the accepted conforming reflectance value is a known accepted standard of reflectance of the reflective coating.

4. The method of claim 2, further comprising:
calculating the quality metric of the conforming region based on the detector receiving the reflected first radiation and the reflected second radiation from a reflective surface of a flat optical element including the reflective coating.

5. The method of claim 2, further comprising:
calculating the quality metric of the conforming region based on the detector receiving the reflected first radiation and the reflected second radiation from a second region of the curved surface of the optical element having the reflective coating.

6. The method of claim 1, further comprising:
emitting along the second optical axis, by the extended radiation source, third radiation at the first intensity;
receiving, by the detector, the third radiation;
determining the first irradiance value from the received third radiation;
emitting along the second optical axis, by the radiation source, fourth radiation at the second intensity;
receiving, by the detector, the fourth radiation; and
determining the second irradiance value from the received fourth radiation.

7. The method of claim 1, wherein the first count is a count of photons reflected from the region as the received first radiation, the second count is a count of photons reflected from the region as the received second radiation, and the first and second irradiance values are obtained without reflection from the optical element.

8. The method of claim 1, wherein calculating the reflectance value further comprises:
calculating the reflectance value based on a difference between a third irradiance value and a fourth irradiance value and a difference between a third count and a fourth count, the third irradiance value and the third count based on a third intensity, and the fourth irradiance value and the fourth count based on a fourth intensity, the fourth intensity being higher than the third intensity, the third intensity being higher than the second intensity, and the second intensity being higher than the first intensity.

9. The method of claim 1, further comprising:
calculating a linear least square fit to the first count the second count, the first irradiance value, and the second irradiance value.

10. The method of claim 1, wherein the first radiation and the second radiation are included in a wavelength range of one of (a) between 10 nm and 400 nm; (b) between 400 nm and 700 nm; (c) between 700 nm and 1 mm; and (d) between 1 mm and 10 mm.

11. A system for calculating a reflectance value comprising:
a radiation source configured to emit first radiation at a first intensity along a first optical axis and emit second radiation at a second intensity along the first optical axis;
an optical element including a curved surface having a reflective coating;
a region of the curved surface configured to reflect the first radiation along a second optical axis separated from the first optical axis by a predetermined angle, and reflect the second radiation along the second optical axis;
a detector configured to receive the reflected first radiation and receive the reflected second radiation; and
a controller configured to determine a first count from the received first radiation, determine a second count from the received second radiation, and calculate the reflectance value based on a difference between the first count and the second count and a difference between a first irradiance value and a second irradiance value.

12. The system of claim 11, further comprising:
a flat optical element including the reflective coating; and
the detector is further configured to:
receive the reflected first radiation and the reflected second radiation from a reflective surface of the flat optical element.

13. The system of claim 11, wherein the extended radiation source is further configured to emit third radiation at the first intensity and fourth radiation at the second intensity along the second optical axis;
the detector is further configured to receive the third radiation and the fourth radiation; and
the controller is configured to determine the first irradiance value from the received third radiation and determine the second irradiance value from the received second radiation.

14. The system of claim 11, wherein the first count is a count of photons reflected from the region as the received first radiation, the second count is a count of photons reflected from the region as the received second radiation, and the first and second irradiance values are obtained without reflection from the optical element.

15. The system of claim 11, wherein the controller is further configured to calculate the reflectance value based on a difference between a third irradiance value and a fourth irradiance value and a difference between a third count and a fourth count, the third irradiance value and the third count based on a third intensity, and the fourth irradiance value and the count based on a fourth intensity, the fourth intensity being higher than the third intensity, the third intensity being higher than the second intensity, and the second intensity being higher than the first intensity.

16. The system of claim 15, wherein each count is a photon count of a number of photons received by the detector and each of the first intensity, the second intensity, the third intensity, and the fourth intensity is a temperature included in a range of 18° C. to 32° C.

17. The system of claim 11, wherein the controller is further configured to calculate a linear least square fit to the first count, the second count, the first irradiance value, and the second irradiance value.

18. The system of claim 11, wherein the extended radiation source is a flat field extended source blackbody.

19. The system of claim 11, wherein a camera includes the detector and a lens coupled to the camera, the lens configured to:
   receive the reflected first radiation;
   transmit the reflected first radiation to the detector;
   receive the reflected second radiation; and
   transmit the reflected second radiation to the detector.

20. The system of claim 11, wherein the first radiation and the second radiation are included in a wavelength range of one of (a) between 10 nm and 400 nm; (b) between 400 nm and 700 nm; (c) between 700 nm and 1 mm; and (d) between 1 mm and 10 mm.

* * * * *